United States Patent [19]

Chambers

[11] Patent Number: 4,501,505
[45] Date of Patent: Feb. 26, 1985

[54] THRUST BEARING

[76] Inventor: William S. Chambers, c/o Kingsbury, Inc., 10385 Drummond Rd., Philadelphia, Pa. 19154

[21] Appl. No.: 617,721

[22] Filed: Jun. 6, 1984

[51] Int. Cl.³ ............................................. F16C 17/06
[52] U.S. Cl. .................................. 384/152; 384/305; 384/306; 384/307
[58] Field of Search ............... 384/152, 305, 306, 307, 384/122, 123, 308

[56] References Cited

U.S. PATENT DOCUMENTS

| | | |
|---|---|---|
| 1,117,504 | 11/1914 | Kingsbury . |
| 1,293,471 | 2/1919 | Kingsbury . |
| 1,900,924 | 3/1933 | Firth . |
| 2,168,345 | 8/1939 | Kingsbury . |
| 2,363,260 | 11/1944 | Peskin . |
| 2,507,021 | 5/1950 | Lakey . |
| 3,132,908 | 5/1974 | Grotzinger ........................ 384/308 |
| 3,454,312 | 7/1969 | Bielec ................................ 384/307 |
| 3,814,487 | 6/1974 | Gardner ............................ 384/307 |
| 3,891,281 | 6/1975 | Jenness .............................. 384/306 |

OTHER PUBLICATIONS

Kingsbury's Guide to Equalizing Thrust Bearings, Catalog E Q H, A Comparison of Tilting Pad Thrust Bearing Lubricant Supply Methods.

Mikula and Gregory, Journal of Lubrication Technology, Jan. 1983, vol. 105/39.

Primary Examiner—Lenard A. Footland
Attorney, Agent, or Firm—John F. A. Earley; John F. A. Earley, III

[57] ABSTRACT

A thrust bearing for use with a shaft having a collar mounted thereon, comprising a base ring, a thrust bearing shoe having a leading edge connected to a trailing edge by an inner diameter edge and an outer diameter edge and having a working face with a bearing liner on its surface, a series of shoes positioned on the base ring, a shoe pivot on each shoe allowing the shoe to pivot in any direction, an oil distribution groove formed in the working face near the leading edge of the shoe and extending radially for substantially the entire distance between the inner and outer diameter edges of the shoe, said oil distribution groove having an inner end and an outer end connected by a leading edge and a trailing edge, and a bleed groove extending radially from the inner end of the oil distribution groove to the inner diameter edge of the shoe for supplying oil to the inner diameter area of the shoe downstream of the bleed groove which downstream inner diameter area would otherwise be starved by oil by the centrifugal inertial effects of rotating the collar.

4 Claims, 9 Drawing Figures

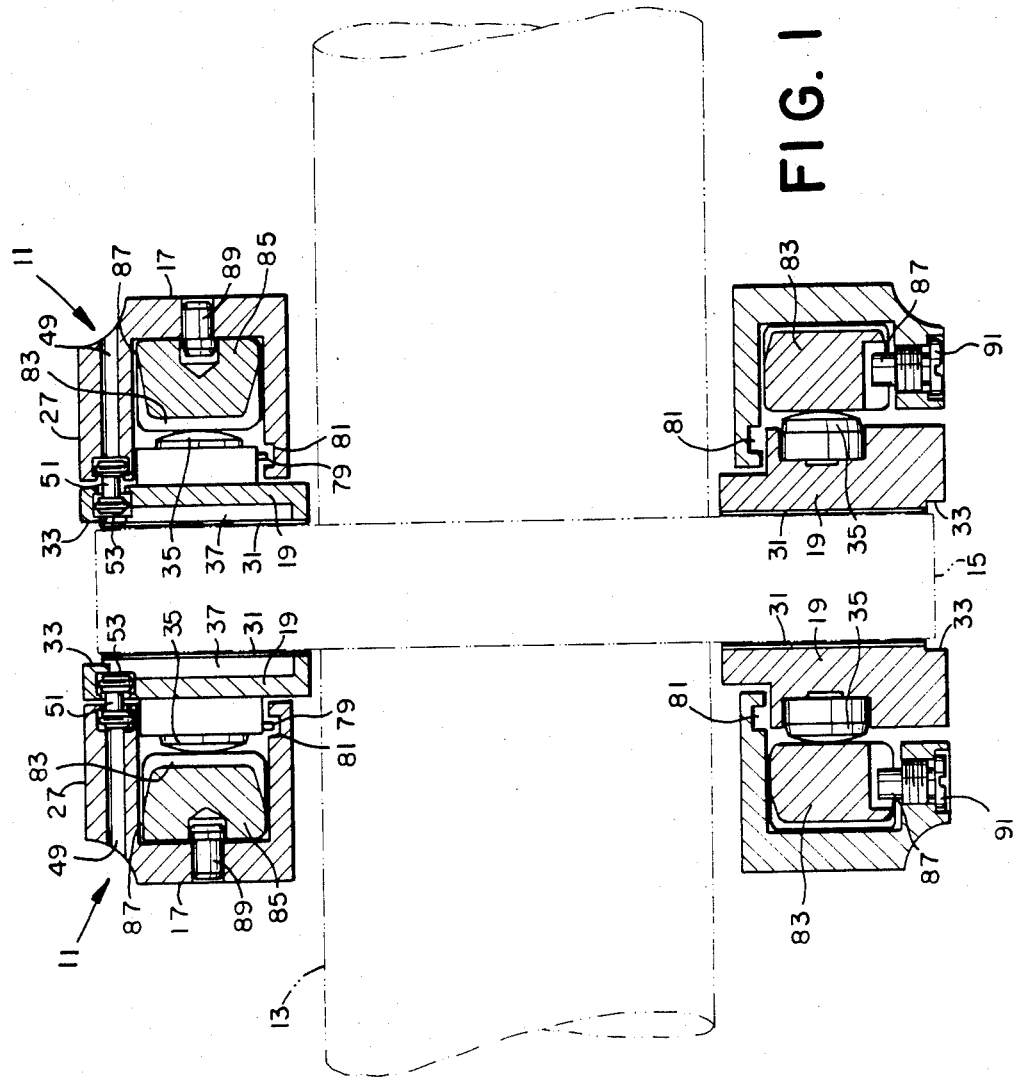

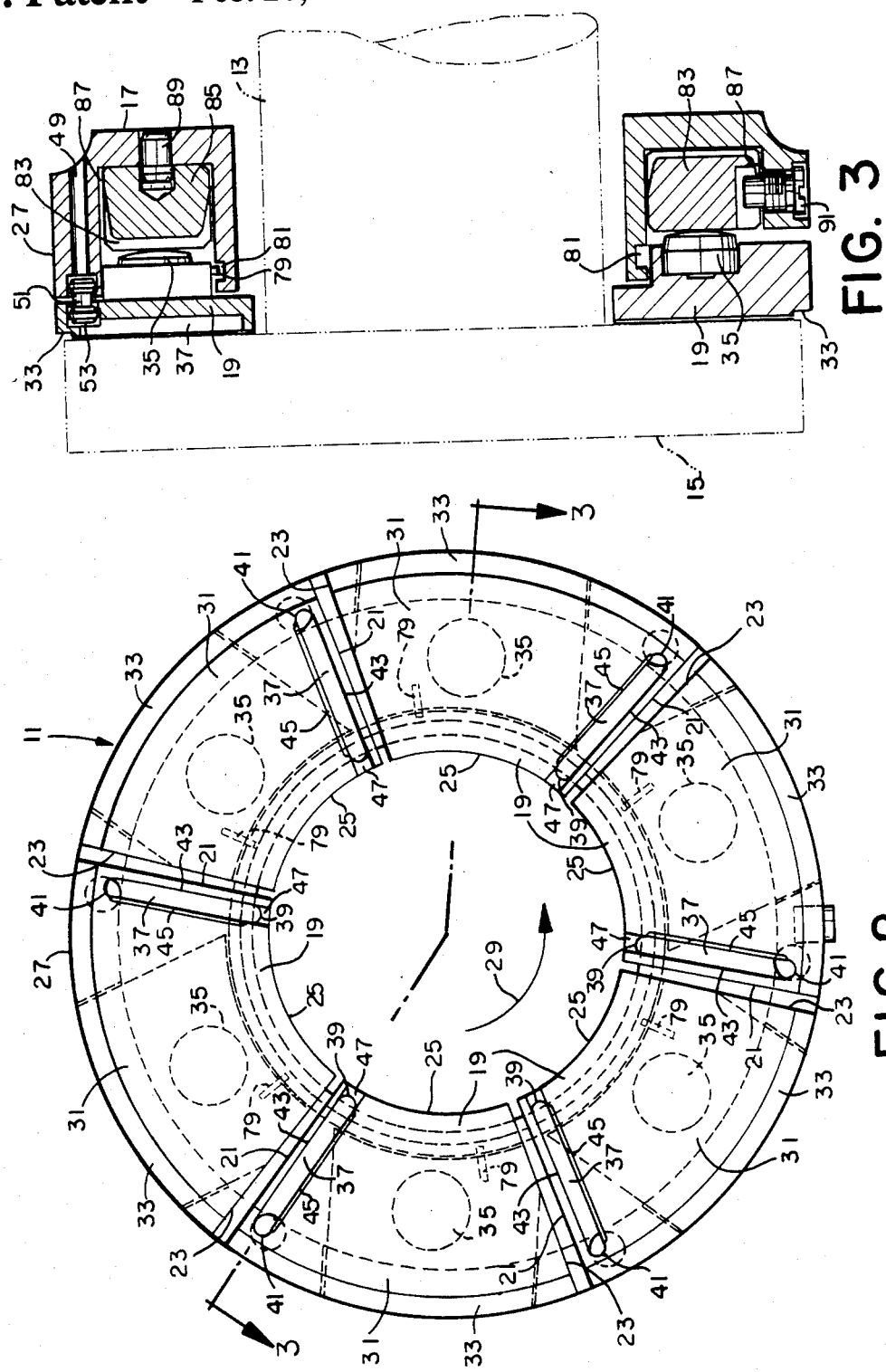

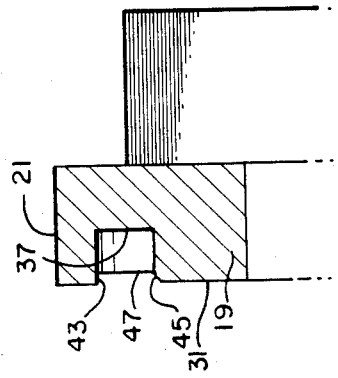
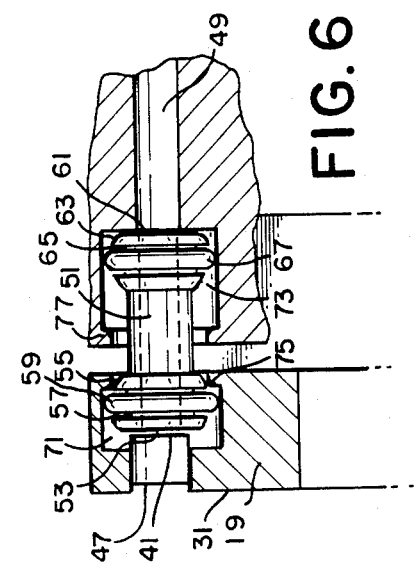
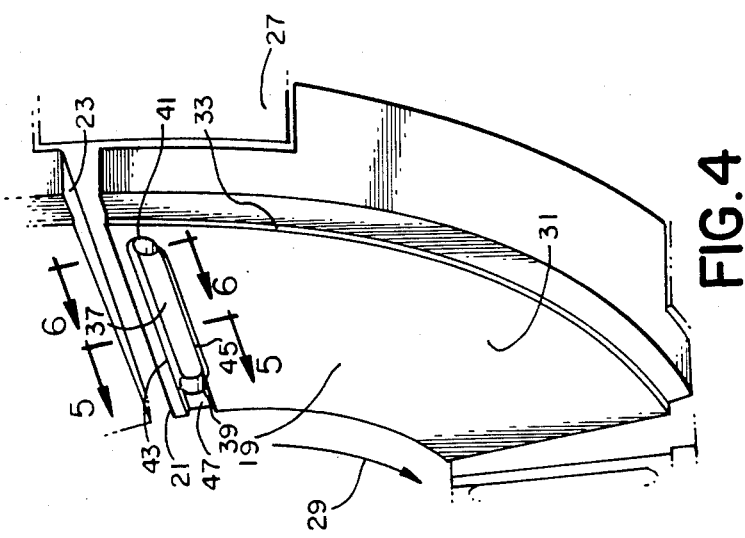

THRUST BEARING

BACKGROUND OF THE INVENTION

1. Field of the Invention

This invention relates to thrust bearings, and more particularly concerns thrust bearings having a leading edge oil distribution groove.

2. Description of the Prior Art

Conventional thrust bearings are provided with a base ring on which is mounted a series of bearing shoes which are positioned so as to face the side of a rotating collar mounted on a rotating shaft. Lubrication is provided to the thrust bearing by feeding oil into passageways in the base ring that lead to the shoes, and flooding the inside of the base ring and the shoes with oil. However, this system of lubrication consumed a large quantity of oil and created a large power loss.

Accordingly, it has been desired to reduce the amount of oil flow in a thrust bearing lubrication system, to increase the load carrying capabilities, and to lower the power loss, in the interest of energy conservation. Besides reducing the amount of oil used, and lowering the power loss, such a system would desirably use a smaller pump and other auxilliary equipment and be more efficient.

SUMMARY OF THE INVENTION

It is an object of this invention to provide a thrust bearing which increases the load carrying capacity, uses less oil, consumes less power, uses smaller auxilliary equipment, and is more efficient than the thrust bearings of the prior art.

This object is accomplished by providing a thrust bearing having a series of shoes with a leading edge distribution groove and a bleed groove leading to the inside diameter edge of the shoe so as to prevent oil starvation of the inner diameter edge area of the shoe caused by centrifugal forces, and an oil feed tube connected between the outer end of the oil distribution groove and an oil supply hole in the base ring, which oil feed tube is provided with O-rings that seal the oil supply system against leakage and directs the oil against the working faces of the shoes where it is needed and prevents the oil from leaking into areas where it is not needed or useful. The oil feed tube is positioned near the outer diameter edge of the thrust bearing and is connected to an axially drilled oil supply hole in the base ring, so as to eliminate radial oil supply passageways in the base ring and so as to reduce the overall height of the base ring between the face of the shoes and the far end of the base ring.

BRIEF DESCRIPTION OF THE DRAWINGS

FIG. 1 is a view in elevation of a pair of thrust bearings constructed in accordance with this invention and positioned on each side of a rotating collar mounted on a shaft;

FIG. 2 is a view looking at the faces of the shoes of one of the thrust bearings;

FIG. 3 is a view in section taken as indicated by the lines and arrows 3—3 which appear in FIG. 2;

FIG. 4 is an enlarged view in perspective of a bearing shoe which is adapted for use with a collar that is rotating in a clockwise direction, whereas the shoes shown in FIG. 2 are adapted for use with a collar that is rotating in a counterclockwise direction.

FIG. 5 is a view in section taken as indicated by the lines and arrows 5—5 which appear in FIG. 4;

FIG. 6 is a view in section taken as indicated by the lines and arrows 6—6 which appear in FIG. 4;

Figure 7:
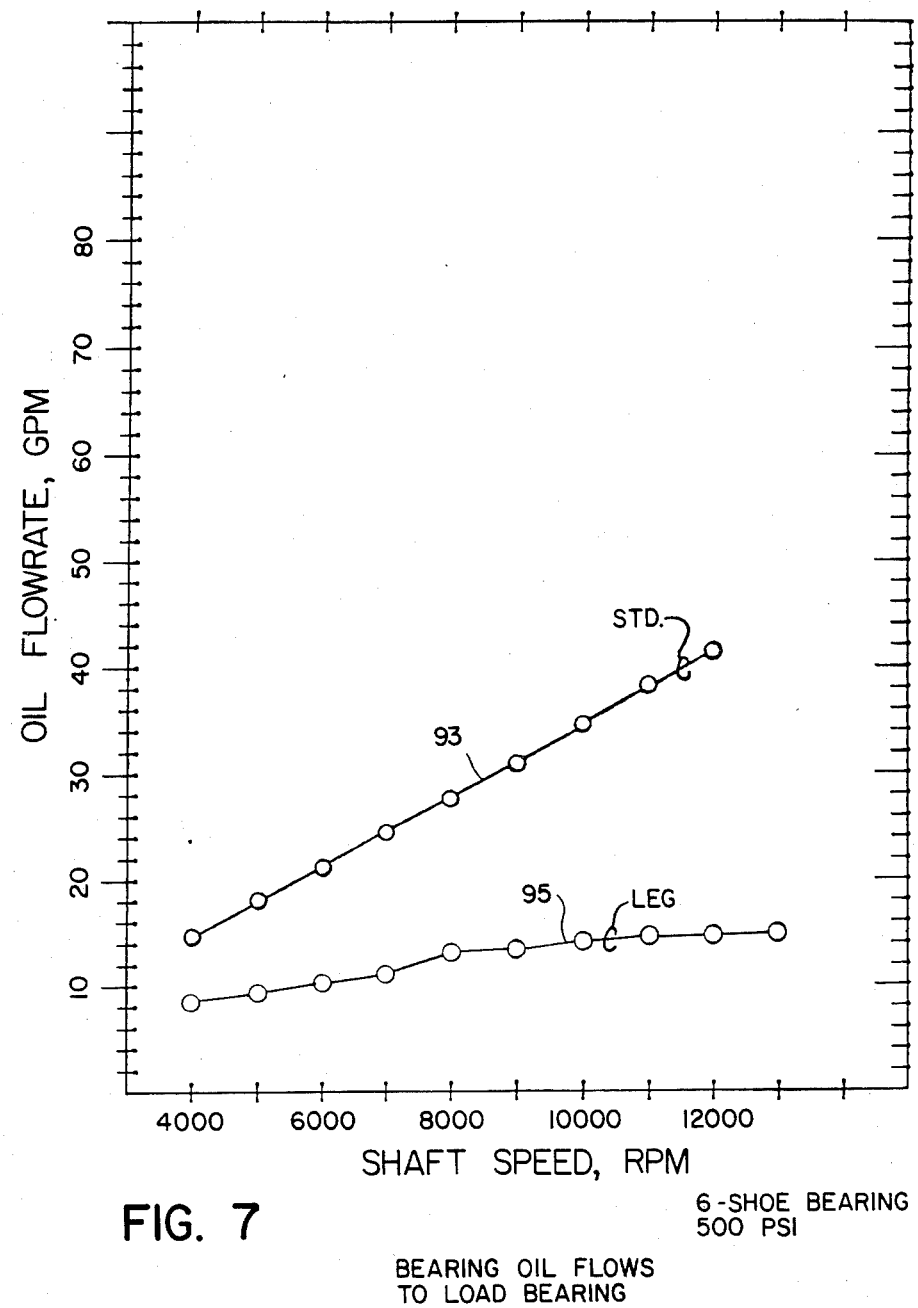
FIG. 7 is a graph which compares oil flow rate in gallons per minute against shaft speed in revolutions per minute of a standard $10\frac{1}{2}$ inch Kingsbury thrust bearing as shown and described in Kingsbury's *Guide To Equalizing Thrust Bearings*, Catalog EQH, which is incorporated herein by reference, and a $10\frac{1}{2}$ inch Kingsbury LEG thrust bearing constructed in accordance with this invention.

LEG is a trademark of Kingsbury, Inc., Philadelphia, Pa., used to identify the inventive thrust bearings.

DETAILED DESCRIPTION

Turning now to the drawings, there is shown a thrust bearing 11 for use with a shaft 13 having a collar 15 mounted on shaft 13 and rotatable therewith. The thrust bearing 11 comprises a base ring 17, and a series of shoes 19 positioned around the base ring 17.

Each shoe 19 has a leading edge 21 connected to a trailing edge 23 by an inner diameter edge 25 and an outer diameter edge 27. The direction of rotation of collar 15 is indicated by an arrow 29.

Each shoe 19 includes a working face 31 with a bearing liner 33 on its surface.

A shoe pivot 35 is mounted on each shoe 19 so as to face away from the working face 31 of the shoe 19, and is provided with a spherical surface to allow the shoe 19 to pivot freely in any direction to conform to the side surfaces of the collar 15. An oil distribution groove 37 is formed in the working face 31 of the shoe 19 near the leading edge 21 of the shoe and extends radially for substantially the entire distance between inner diameter edge 25 and outer diameter edge 27 of the shoe 19. Oil distribution groove 37 has an inner end 39 and an outer end 41 connected together by a leading edge 43 and a trailing edge 45.

A bleed groove 47 extends radially from the inner end 39 of the oil distribution groove 37 to the inner diameter edge 25 of the shoe 19 for supplying oil to the inner diameter edge area of the shoe 19 downstream of the bleed groove 47, which downstream inner diameter area would otherwise be starved of oil by the centrifugal inertial effects of rotating the collar 15.

Trailing edge 45 of oil distribution groove 37 is chamfered so as to provide a chamfered edge for more easily allowing oil to flow from the oil distribution groove 37 to cover the shoe working face 31 with oil during the rotation of shaft 13 and collar 15.

An oil supply hole 49 is drilled through base ring 17 and extends axially through the base ring near the outer diameter edge 27 of base ring 17.

An oil feed tube 51 is connected between the oil supply hole 49 and the outer end 41 of the oil distribution groove 37 near the outer diameter edge 27 of the shoe 19. The oil feed tube 51 is provided at its near end 53 with a ball shape 55 and an annular recess 57 with an O-ring 59 seated in the recess 57.

The oil feed tube 51 is also provided at its far end 61 with a ball shape 63 and an annular recess 65 with an O-ring 67 seated in the recess 65.

A socket 71 is formed in the shoe 19 and is connected to the oil distribution groove 37 at its outer end 41 for receiving the near end 53 of oil feed tube 51 and its O-ring 59 to seal the tube 51 against oil leaks.

A socket 73 is formed in base ring 17 for receiving the far end 61 of oil feed tube 51 and its O-ring 67 to seal the tube 51 against oil leaks.

A shoulder 75 is formed in the opening of socket 71 for retaining near end 53 of tube 51 in the socket. Similarly, a shoulder 77 is formed at the opening to socket 73 for retaining the far end 61 of oil feed tube 51 in the socket 73.

The oil feed tube 51 performs a dual function. Besides supplying oil from oil supply hole 49 to oil distribution groove 37 and preventing oil leakage from the tube 51 because of the effect of the O-rings 59 and 67, the oil feed tube 51 also assists in retaining the shoe 19 in connection with base ring 17.

Also assisting in retaining the shoe 19 in ring 17 are the retainer pins 79 which extend radially from the shoe 19 into an annular groove 81 in the base ring 17.

Mounted between the shoes 19 and the base ring 17 in thrust bearing 11 are a series of upper leveling plates 83 and lower leveling plates 85 which are placed alternately around base ring 17 in an annular groove 87. Lower leveling plates 85 are positioned by axially directed lower leveling plate retainer dowels 89, and upper leveling plates 83 are positioned by upper leveling plate retainer set screws 91 which are radially directed.

Shoe pivots 35 bear on the upper leveling plates 83, and the action of the alternately placed leveling plates 83, 85 serves to distribute the load evenly among the shoes 19.

In FIG. 7, line 93 indicates the oil flow rate versus shaft speed of a Kingsbury standard equalizing thrust bearing, and the line 95 indicates the oil flow rate versus shaft speed of a Kingsbury LEG thrust bearing constructed in accordance with this invention. In the standard bearing, the oil flow rate ranges from about 14 gallons per minute at 4000 RPM shaft speed to about 42 gallons per minute at about 12,000 RPM shaft speed.

On the other hand, the LEG thrust bearing ranges from about 8 gallons per minute at 4000 RPM to about 15 gallons per minute at 12,000 RPM.

Figure 8:
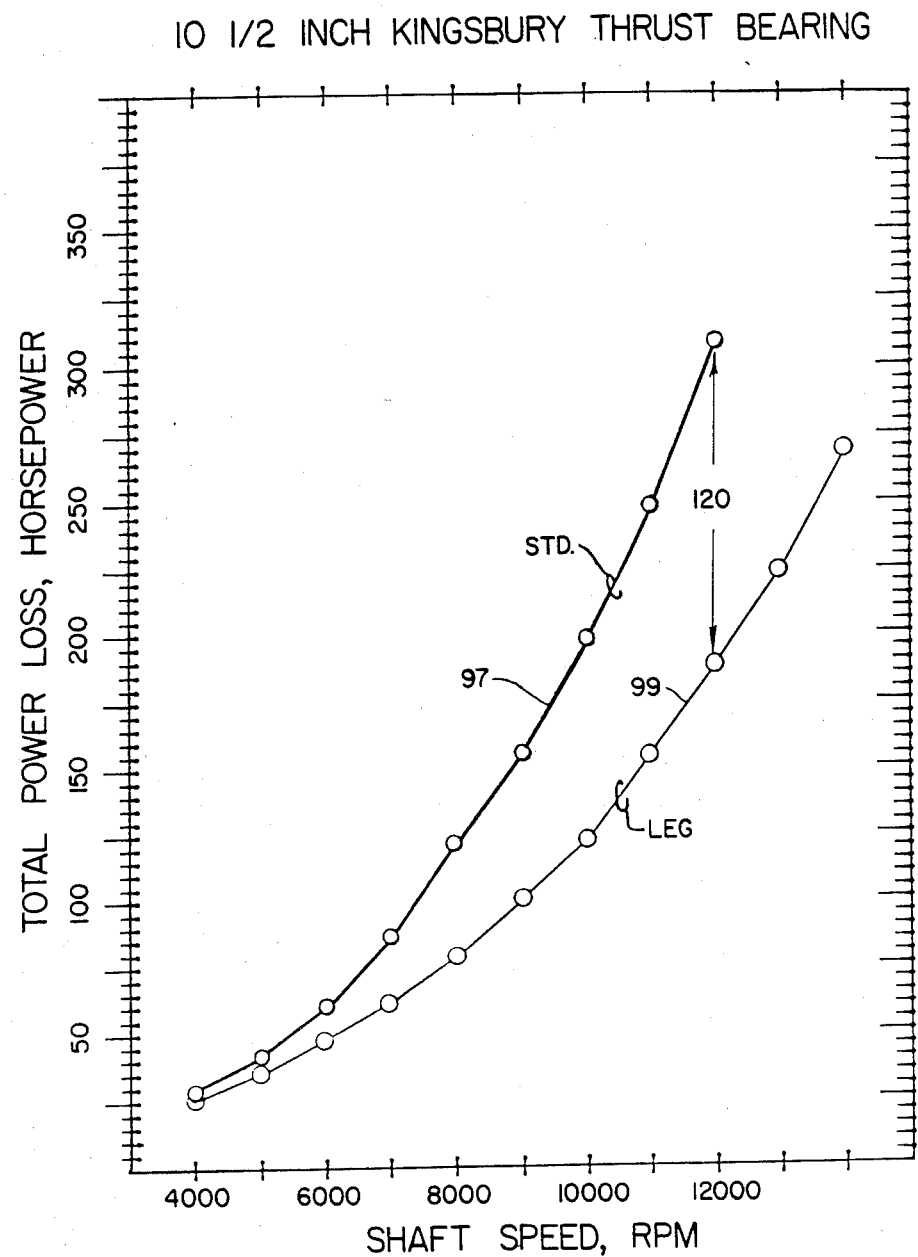
FIG. 8 is a graph which plots total power loss in horsepower against shaft speed in revolutions per minute of a standard $10\frac{1}{2}$ inch Kingsbury thrust bearing against a $10\frac{1}{2}$ inch Kingsbury LEG thrust bearing of the invention.

In FIG. 8, a line 97 shows results of the tests of the Kingsbury standard bearing, and a line 99 shows the results of a comparable Kingsbury LEG bearing constructed in accordance with this invention. The standard bearing ranges from a total power loss of about 30 horsepower at 4000 RPM to about 310 horsepower at 12000 RPM, while the LEG bearing of the present invention ranges from a loss of about 25 horsepower at 4000 RPM to about 190 horsepower at 12,000 RPM, which is a difference of 120 horsepower at 12,000 RPM.

Figure 9:
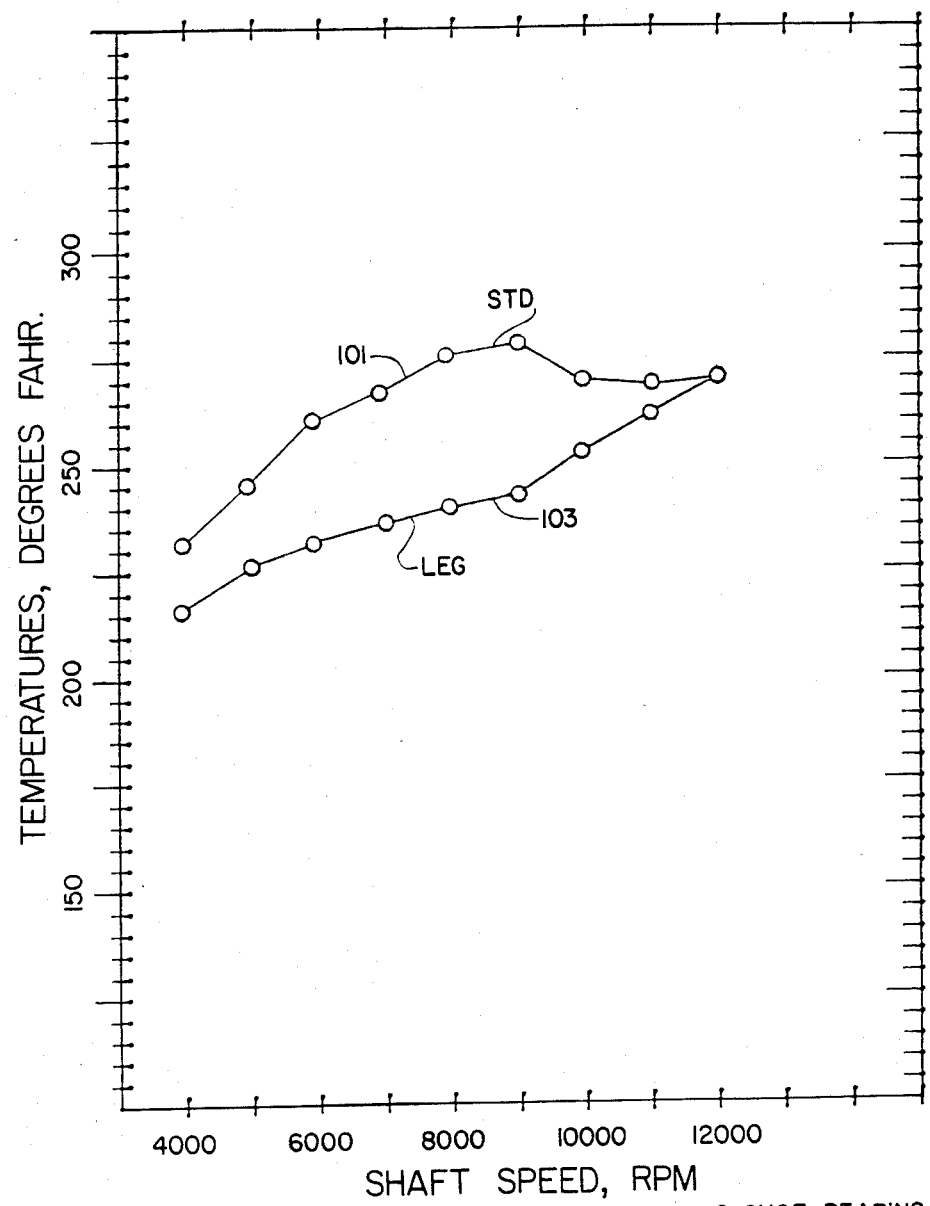
FIG. 9 is a graph which plots temperature in degrees Fahrenheit against shaft speed in revolutions per minute of a standard $10\frac{1}{2}$ inch Kingsbury thrust bearing against a $10\frac{1}{2}$ inch Kingsbury LEG thrust bearing of the invention.

FIG. 9 shows a graph which plots temperature in degrees Fahrenheit against shaft speed in RPM of a standard Kingsbury thrust bearing shown by a line 101 versus a comparative Kingsbury LEG bearing of the present invention shown by line 103. The lines show that the LEG bearing is cooler than the standard bearing at speeds between 4000 RPM and a little above 10,000 RPM.

ADVANTAGES

Thrust bearing 11 of the present invention conserves energy by reducing the oil flow and consumes less power. It uses less lubricant, thus requiring a smaller pump and other auxilliary equipment. Thrust bearing 11 is efficient; it applies the oil lubricant where it is needed and used, at the working face 31 of the shoe 19, and does not flood the base ring, leveling plates, and shoes as in conventional thrust bearings.

Thrust bearing 11 is such an efficient bearing that it runs cooler since the oil is applied just where it is used and it runs cooler so that it can carry higher loads.

Thrust bearing 11 is amaller and easier to manufacture than the thrust bearing disclosed in Lakey U.S. Pat. No. 2,507,021, which issued May 9, 1950, and is incorporated herein by reference. The height of thrust bearing 11 is smaller. The height of the bearing is defined as the axial distance between the bottom of the base ring 17 and the working face 31 of shoe 19. The width of a shoe is defined as the radial distance along a shoe fron outer diameter edge 27 to inner diameter edge 25, and the length of a shoe is defined as the circumferential distance between leading edge 21 and trailing edge 23 of the shoe 19.

Thrust bearing 11 does not have the radial passage 28 as shown in the Lakey U.S. Pat. No. 2,507,021, so that thrust bearing 11 has a smaller height than the thrust bearing disclosed in that patent.

I claim:

1. A thrust bearing for use with a shaft having a collar mounted thereon, comprising a base ring, a thrust bearing shoe having a leading edge connected to a trailing edge by an inner diameter edge and an outer diameter edge, said shoe having a working face with a bearing liner on its surface, a series of shoes positioned on the base ring, shoe pivot means on each shoe allowing the shoe to pivot in any direction, an oil distribution groove formed in the working face near the leading edge of the shoe and extending radially for substantially the entire distance between the inner and outer diameter edges of the shoe, said oil distribution groove having an inner end and an outer end connected by a leading edge and a trailing edge, a bleed groove extending radially from the inner end of the oil distribution groove to the inner diameter edge of the shoe for supplying oil to the inner diameter area of the shoe downstream of the bleed groove which downstream inner diameter area would otherwise be starved of oil by the centrifugal inertial effects of rotating the collar, an oil supply hole extending axially through the base ring near the outer diameter edge of the base ring, an oil feed tube connected between the oil supply hole and the outer end of the oil distribution groove near the outer diameter edge of the shoe, said oil feed tube having a near end with a ball shape and an annular recess with an O-ring seated in the recess, and a far end with a ball shape and an annular recess with an O-ring seated in the recess, a socket formed in the shoe and connected to the oil distribution groove at its outer end for receiving the near end of the oil feed tube and its O-ring to seal the tube against oil leaks, a socket formed in the base ring for receiving the far end of the oil feed tube and its O-ring to seal the tube against oil leaks, shoulders formed at the openings to said sockets for retaining the ends of the tube in the sockets, and a retainer pin extending radially from the shoe into an annular groove in the base ring to assist in retaining the shoe on the base ring.

2. The thrust bearing of claim 1, including
a series of upper and lower leveling plates for equalizing the load on the series of shoes.

3. A thrust bearing for use with a shaft having a collar mounted thereon, comprising
a base ring,
a thrust bearing shoe having a leading edge connected to a trailing edge by an inner diameter edge and an outer diameter edge,
said shoe having a working space with a bearing liner on its surface,
a series of shoes positioned on the base ring,
shoe pivot means on each shoe allowing the shoe to pivot in any direction,
an oil distribution groove formed in the working face near the leading edge of the shoe and extending radially for substantially the entire distance between the inner and outer diameter edges of the shoe,
said oil distribution groove having an inner end and an outer end connected by a leading edge and a trailing edge,
a bleed groove extending radially from the inner end of the oil distribution groove to the inner diameter edge of the shoe for supplying oil to the inner diameter area of the shoe downstream of the bleed groove which downstream inner diameter area would otherwise be starved of oil by the centrifugal inertial effects of rotating the collar,
said trailing edge of the oil distribution groove being a chamfered edge for more easily allowing oil to flow from the oil distribution groove to cover the shoe working face with oil,
an oil supply hole extending axially through the base ring near the outer diameter edge of the base ring,
an oil feed tube connected between the oil supply hole and the outer end of the oil distribution groove near the outer diameter edge of the shoe,
said oil feed tube having a near end with a ball shape and an annular recess with an O-ring seated in the recess, and a far end with a ball shape and an annular recess with an O-ring seated in the recess,
a socket formed in the shoe and connected to the oil distribution groove at its outer end for receiving the near end of the oil feed tube and its O-ring to seal the tube against oil leaks,
a socket formed in the base ring for receiving the far end of the oil feed tube and its O-ring to seal the tube against oil leaks,
shoulders formed at the openings to said sockets for retaining the ends of the tube in the sockets, and
a retainer pin extending radially from the shoe into an annular groove in the base ring to assist in retaining the shoe on the base ring.

4. The thrust bearing of claim 3, including
a series of upper and lower leveling plates for equalizing the load on the series of shoes.

* * * * *